UNITED STATES PATENT OFFICE.

ARNO BEHR, OF JERSEY CITY, NEW JERSEY.

PROCESS OF MANUFACTURING CRUSHED ANHYDROUS GRAPE-SUGAR.

SPECIFICATION forming part of Letters Patent No. 256,623, dated April 18, 1882.

Application filed February 28, 1882. (No specimens.)

*To all whom it may concern:*

Be it known that I, ARNO BEHR, of Jersey City, New Jersey, have invented a Process of Manufacturing Crushed Anhydrous Grape-Sugar, of which the following is a specification.

My invention relates to a modification of the process of manufacturing crystallized anhydrous grape-sugar from a watery solution of very pure grape-sugar described in Letters Patent of the United States No. 250,333, issued to me December 6, 1881. In another pending application I have described a process of manufacturing crystallized anhydrous grape-sugar from a watery solution of grape-sugar of comparatively low grade, the characteristic feature of which is the deposit of the concentrated solution in molds and the maintenance of the filled molds at a temperature of about 90° Fahrenheit for a period of from one to two weeks, and the subsequent draining of the crystallized mass contained in the molds by the use of a centrifugal machine, in which the molds are placed.

It is the object of my present process to avoid the labor and expense attendant upon the use of molds for containing the concentrated solution during the process of slow crystallization; and I accomplish this object by conducting the process of slow crystallization in large vessels or tanks, whereby I obtain a mass containing crystals of large size, which mass I then remove from the tank or vessel in which crystallization has taken place and crush it between rollers, and thereby form a magma, which can be introduced in bulk into the basket of an ordinary centrifugal machine, and drained in the same way that soft cane-sugar is drained.

It will therefore be seen that my present invention consists, first, in so conducting the process of crystallization as to obtain large-sized crystals of anhydrous grape-sugar from a watery solution of grape-sugar, and in then crushing the crystallized mass, and, finally, in draining the crushed mass in bulk by means of a centrifugal machine.

In carrying out my process I form a watery solution of grape-sugar containing, say, thirteen per cent. of water and deposit the same in a suitable tank or vessel, and maintain it at a temperature of about 90° Fahrenheit for a period of one to two weeks, or until thorough crystallization has taken place. The period of time required for crystallization will vary according to the purity of the grape-sugar which enters into the solution.

In order to somewhat hasten crystallization, I introduce into the concentrated solution a minute quantity of finely-divided crystallized anhydrous grape-sugar previously prepared. For example, in dealing with a solution of grape-sugar of, say, ninety-two purity—that is, containing ninety-two parts of pure grape-sugar in one hundred parts of dry substance— one three-hundred-thousandth part of powdered anhydrous grape-sugar incorporated into the mass will hasten the process of crystallization, and yet result in the production of coarse crystals. If a considerably larger proportion of previously-prepared anhydrous crystals should be used—as, for example, say one hundred-thousandth part—the resulting crystals would be finer, and there would be difficulty in perfectly draining the crushed mass. It is therefore essential to my present invention to so conduct the operation of crystallization as to obtain coarse crystals.

The next step of my process is to crush the crystallized mass, which may be effected by means of rollers or in any convenient way. Finally, I introduce the crushed mass of crystallized anhydrous grape-sugar in bulk into the basket of an ordinary centrifugal machine, by the operation of which it is effectually drained.

The draining by the centrifugal machine should be performed as soon as possible after the mass is crushed while the sirup remains limpid, otherwise the sirup, especially if the sugar is pure, may become stiff by secondary fine crystallization. It is also important in carrying out my process that crystallized hydrate of grape-sugar shall be carefully excluded from the concentrated solution.

It will of course be understood that in carrying out the process which forms the subject of my present invention I may commence by manufacturing grape-sugar by any of the ordinary methods, and may treat the resulting product as herein set forth; or I may treat ordinary commercial grape-sugar already manufactured by dissolving or melting it, and proceeding as herein set forth.

I claim as my invention—

The herein-described process of manufacturing crystallized anhydrous grape-sugar, which consists in first producing a coarse crystallization of anhydrous grape-sugar by subjecting a concentrated watery solution of grape-sugar to a temperature of about 90° Fahrenheit for a sufficient period of time to effect complete crystallization, and in then crushing the crystallized mass, and finally draining it in a centrifugal machine.

ARNO BEHR.

Witnesses:
M. Q. ADAMS,
W. G. HALSEY.